May 4, 1965

S. I. RICE ETAL 3,181,401

MACHINE TOOL

Filed Nov. 1, 1961

INVENTORS
Stanley I. Rice
Alden H. Jacobson

BY
Norman S. Blodgett
Attorney

May 4, 1965   S. I. RICE ETAL   3,181,401
MACHINE TOOL

Filed Nov. 1, 1961   4 Sheets-Sheet 2

INVENTORS
Stanley I. Rice
Alden H. Jacobson

BY
Norman S. Blodgett
Attorney

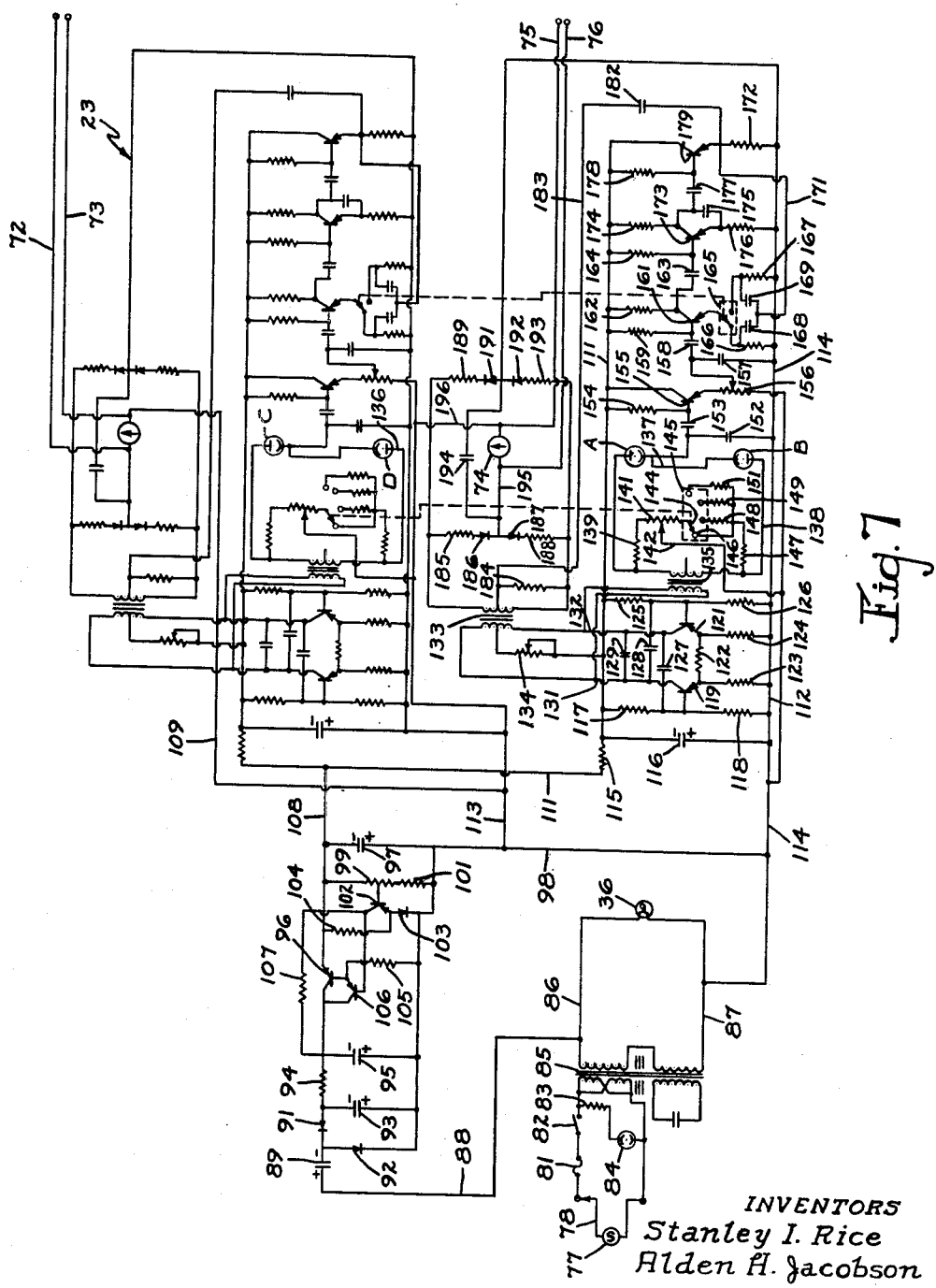

INVENTORS
Stanley I. Rice
Alden H. Jacobson

United States Patent Office 3,181,401
Patented May 4, 1965

3,181,401
MACHINE TOOL
Stanley I. Rice, Worcester, and Alden H. Jacobson, Paxton, Mass., assignors to The Heald Machine Company, Worcester, Mass., a corporation of Delaware
Filed Nov. 1, 1961, Ser. No. 149,410
4 Claims. (Cl. 82—34)

This invention relates to a machine tool and more particularly to apparatus arranged to produce a surface of revolution on a workpiece by contact with a very accurately located cutting edge.

In automatic machining operations, one of the greatest difficulties encountered is the accurate location of the tool before the machining cycle starts. This is particularly true where the surface being generated is complicated and the control of the shape is accomplished automatically by use of perforated tape or other control media. It has been found, for instance, that beneficial results may be obtained when the cutting edge of the tool is a perfect circle. This means that the cutting point of the tool relative to center line of the tool is not as critical as would be true when the cutting edge is some other shape. Furthermore, in very accurate work it is very often necessary that the tool be located without a mechanical touching of the cutting edge. Also, it is sometimes important that the cutting edge be examined before the cutting operation to assure that it is a perfect, unbroken circular edge. These and other deficiencies of the prior art devices have been obviated in a novel manner by the present invention.

It is, therefore, an outstanding object of the invention to provide a machine tool having means for very accurately determining the position of the tool cutting edge relative to the other elements of the machine.

Another object of this invention is the provision of a machine tool in which a circular cutting edge may be very accurately located without being touched physically.

A further object of the present invention is the provision of a machine tool in which a circular cutting edge may be examined quickly and accurately for perfection.

It is another object of the instant invention to provide a machine tool involving apparatus of an optical-electric nature for determining both the location and the degree of perfection of a circular cutting edge.

With these and other objects in view, as will be apparent to those skilled in the art, the invention resides in the combination of parts set forth in the specification and covered by the claims appended hereto.

The character of the invention, however, may be best understood by reference to certain of its structural forms as illustrated by the accompanying drawings, in which:

FIG. 7 is an electrical schematic view of some of the electrical equipment constituting part of the invention;

Figure 1:
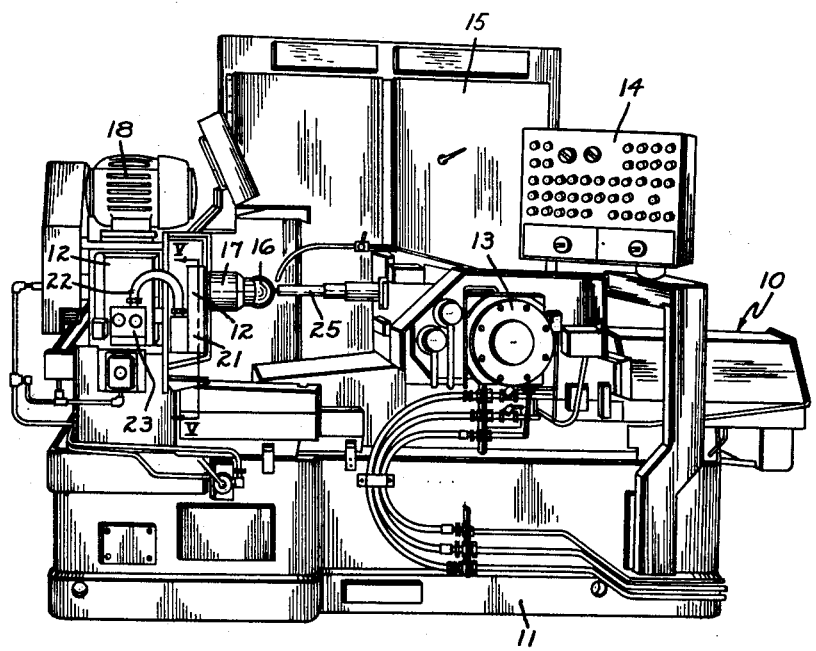
FIG. 1 is a perspective view of a machine tool embodying the principles of the present invention.

Referring first to FIG. 1, wherein are best shown the general features of the invention, the machine tool, indicated generally by the reference numeral 10, is shown as consisting of a base 11 on which are mounted a workhead 12 and a tool holder 13. Also mounted on the machine is an electrical control panel 14 and a tape control apparatus 15. Mounted on the workhead 12 is a workpiece 16 on which is to be generated a surface of revolution 17. Rotation of the workpiece takes place about the axis of the surface of revolution under the action of a motor 18. Mounted on the base beside the workhead is a tool locating and checking apparatus 19, including an optical member 21 with a cable 22 leading to an electronic control box 23.

Figure 2:
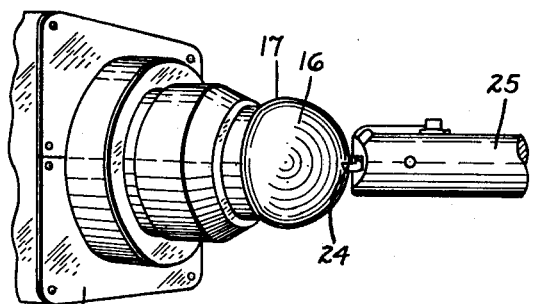
FIG. 2 is an enlarged perspective view of a portion of the machine.
Figure 3:
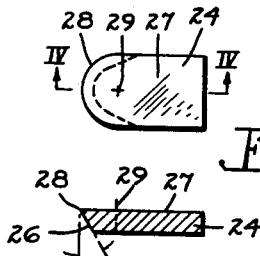
FIG. 3 is a plan view of a tool used in the machine.
Figure 4:
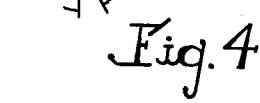
FIG. 4 is a sectional view of the tool taken on the line IV—IV of FIG. 3.

Referring to FIG. 2, it can be seen that the workpiece 16 has its surface of revolution 17 formed by means of a tool 24 mounted on a bar 25 which extends from the tool holder 13. In FIGS. 3 and 4 are shown the details of the tool 24. It has a plate-like configuration and is formed of either carbide or high-speed tool steel. According to one method, the tool is ground with a conical surface 26 which intersects an upper flat surface 27 to define a circular cutting edge 28. The conical surface 26 is ground by mounting the tool in a fixture and presenting it to the flat side of a rotating grinding wheel. The fixture is provided with a pivotal axis perpendicular to the surface 27 but which may be inclined at an angle away from the surface of the grinding wheel so that the surface 26 can be ground as a right circular cone. Since the intersection of a plane perpendicular to the axis of a right circular cone intersects its surface in a circle, the cutting edge 28 is, therefore, perfectly circular and has an imaginary center of curvature 29.

Figure 6:
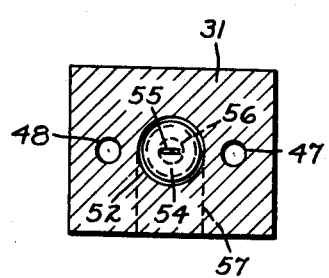
FIG. 6 is a horizontal sectional view taken on the line VI—VI of FIG. 5.
Figure 5:
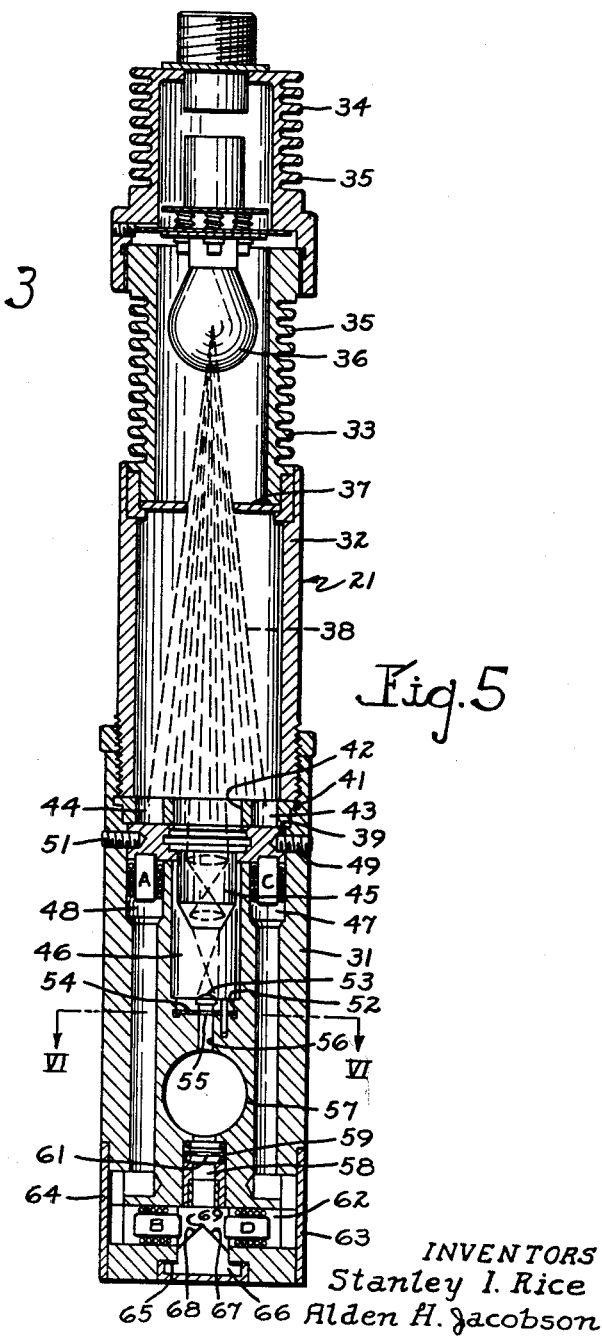
FIG. 5 is a vertical sectional view of an apparatus taken on the line V—V of FIG. 1.

FIGS. 5 and 6 show the details of the optical member 21. First of all, it is provided with a base 31 on which is mounted a lower tube 32 and an upper tube 33 at the top of which is situated a cap 34. The upper tube 33 and the cap 34 are provided with cooling ribs 35. Mounted in the cap 34 and extending downwardly into the upper tube is a source of light, such as an incandescent bulb 36. Mounted below the bulb between the upper tube 33 and lower tube 32 is a plate 37 serving to define with the bulb 36 a ray 38 of light. The upper end of the base 31 is provided with a bore 39 at the top of which is fastened a plate 41 having a central bore 42 and two bores 43 and 44 located in diametrically opposite positions on either side. Mounted in the bore 42 and dependent therefrom is a lens unit 45 whose lower end extends into a bore 46 extending downwardly from the bottom of the bore 39 into the base. Underlying the bore 43 in the plate 41 is a bore 47 extending vertically downwardly into the base from the bottom of the bore 39. In this bore is mounted a photo-sensitive element, such as a photoelectric cell C. Similarly, underlying the bore 44 in the plate 41 is a bore 48 extending into the base and this bore is provided with a photoelectric cell A. Extending through the wall of the base surrounding the bore 39 is a set screw 49 whose inner end underlies the bore 43. In like manner, a set screw 51 extends through the wall and underlies the bore 44. The bottom of the bore 46 is provided with a counterbore 52 of somewhat smaller diameter and at the upper part of the counterbore (the bottom of the bore 46) a collimating lens 53 is located. At the bottom of the counterbore 52 is mounted a plate 54 provided with a very accurately-formed slit 55. Below the plate is provided a bore 56 whose diameter is slightly larger than the length of the slit 55. The bottom of the bore 56 extends vertically into a horizontal passage or bore 57 passing through the base 31 from the side opposite the part from which the cable 22 extends. From the bottom of the bore 57 extends a vertical bore 58 in which is mounted another plate 59 having a slit 61 exactly similar in size and shape to the slit 55 formed in the plate 54. The bottom end of the bore 58 opens into a horizontal passage 62 extending across the bottom of the base. At one side of the bore 58 this passage is provided with a photoelectric cell D, while at the other side it is provided with a photoelectric cell B. The ends of the passages are closed off by plates 63 and 64 at its outer ends. A recess is formed in the passage 62 directly underlying the bore 58 and in this recess is located a mirror 66 having two upwardly-directed plane surfaces 67 and 68 which meet to form a dividing line 69, which line exactly divides the light passing downwardly through the slits 55 and 61. The angles of the surfaces 67 and 68 are such that the vertical light striking them is passed horizontally into the passage 62 on either side to impinge on the photoelectric cells D and B. The bores 47 and 48 extending downwardly from the photoelectric cells A and C are joined by suitable passages to the passage 62 carrying the photoelectric cells B and D. This allows for connecting wires which eventually pass through the cable 22 to the electronic control box 23, as will be described.

FIG. 7 shows the electric circuitry used in the electronic control box 23. In connection with this circuit, note should be taken of the output meter 71 from which extends leads 72 and 73 and output meter 74 from which extend leads 75 and 76. Also included in the circuit are the photocells A, B, C, and D. A source 77 of 110-volt, 60-cycle, alternating-current electricity is connected to the circuit by lines 78 and 79. The line 78 contains a fuse 81 and a main switch 82. Across the two lines is connected a resistor 83 and a neon indicator 84 in series with one another. The lines 78 and 79 are connected to a primary winding of a voltage-regulating transformer 85. The secondary of this transformer is connected to lines 86 and 87 across which is connected the incandescent bulb 36. The line 86 is connected by a line 88 to one side of a capacitor 89 the other side of which is connected to a rectifier 91 arranged to pass current only toward the capacitor. It is also connected to one side of a rectifier 92 arranged to carry current only away from the capacitor. The capacitor 89 and the rectifiers 91 and 92 constitute a voltage doubler. Across the other side of the rectifiers 91 and 92 is connected a capacitor 93. One side of the capacitor 93 is connected to one side of a resistor 94, the other side of which is connected to one side of a capacitor 95. The sides of the capacitors 93 and 95 which are not connected to the resistor 94 are connected to each other, the resistor 94 and the capacitors 93 and 95 constituting a filter. The common side of the resistor 94 and the capacitor 95 is connected to the collector of a transistor 96, the emitter of which is connected to one side of a capacitor 97. The other side of the capacitor 97 is connected by a line 98 to the line 87 coming from the transformer 85. The emitter of the transistor 96 is connected to a variable resistor 99, the other side of the resistor element of which is connected to one side of a resistor 101. The other side of this last-named resistor is connected to the line 98 and to the other side of the capacitor 97. The movable or tap element of the variable resistor 99 is connected to the base of a transistor 102 whose emitter is connected through a rectifier 103 to the end of the resistor 101 which is not connected to the variable resistor 99. The rectifier 103 is connected to carry current only away from the emitter of the transistor 102. A common point of the emitter of the transistor 102 and the rectifier 103 is connected through a fixed resistor 104 to the emitter of the transistor 96. The common sides of the rectifier 103 and the resistor 101 is connected to the common sides of the capacitors 93 and 95 and also through a resistor 105 to the emitter of a transistor 106. This emitter is also connected to the base of the transistor 96. The collector of the transistor 106 is connected to the collector of the transistor 96, while the base of the transistor 106 is connected to the collector of the transistor 102. The collector of the transistor 102 is also connected through a fixed resistor 107 to the common point of the resistor 94 and capacitor 95. The common point of the capacitor 97, the resistor 99, and the resistor 104, as well as the transistor 96 is connected by a line 108 to a circuit 109 including the photocells C and D and the meter 71. The line 108 also is connected by a line 111 to a circuit 112 containing the photocells A and B as well as the meter 74. The line 98 is also connected to the circuit 109 by a line 113 and to the circuit 112 by a line 114.

The transistors 96, 102, and 106 and the associated equipment make up a voltage regulator in which the rectifier 103 is a reference diode having a constant voltage, of the type known as a Zener diode, and the circuitry supplies constant D.C. voltage to the lines 108 and 98. For instance, with reference to the circuit 112, a constant D.C. voltage at 6.5 volts is supplied to the lines 111 and 114 entering the circuit. The line 111 is connected through a resistor 115 to one side of a capacitor 116, the other side of which is connected to the line 114. Across the capacitor 116 are connected two resistors 117 and 118 in series. Two transistors 119 and 121 have their emitters connected together by a fixed resistor 122. The collector of the transistor 119 is also connected through a resistor 123 to the continuation of the line 114, while the collector of the transistor 121 is connected to the line 114 through a fixed resistor 124. The case of the transistor 119 is connected to the common point between the resistors 117 and 118. Between the lines 111 and 114 are also connected in series two fixed resistors 125 and 126, their common point is connected to the base of the transistor 121. The common point between the resistors 117 and 118 is connected by a capacitor 127 to the collector of the transistor 121. Similarly, the common point between the resistors 125 and 126 is connected through a capacitor 128 to the collector of the transistor 119. The collectors of the transistors 119 and 121 are connected directly by a capacitor 129. The opposite sides of the capacitor 129 are connected to lines 131 and 132 which are connected to opposite ends of a transformer 133 having a center tap connected to one side of a variable resistor 134, the other side of which is connected to the line 111. The lines 131 and 132 are also connected to opposite ends of a primary winding of a transformer 135. The transistor 119 and 121 and the capacitors and resistors associated with it form a free-running multi-vibrator whose frequency is selected at 3.5 kilocycles. The output signal of this multi-vibrator appears on the lines 131 and 132 leading to the transformers 133 and 135.

One side of the secondary (winding) of the transformer 135 is connected by a line to one side of the photocell A. The other side of the photocell A is connected by a line 137 to one side of the photocell B, the other side of which is connected by a line 138 to the other side of the secondary of the transformer 135. The said one side of the secondary of the transformer 135 is connected to one side of a resistor 139, the other end of which is connected to one end of the resistance element of a potentiometer 141. The movable element of the potentiometer is connected by a line 142 to a line 143 which is connected to the line 114. The other end of the resistance element of the potentiometer 141 is connected to the movable element 144 of a rotary multiple-contact switch 145. The rotary switch has a contact element 146 which is joined to one end of a resistor 147, the other end of which is connected to the line 138 joining the secondary of the transformer 135 to the photocell B. The side of the resistor 147 connected to the contact element 146 is also connected to other contact elements of the switch 145 through resistors 148, 149 and 151. The side of the photocell A to which the line 137 is attached is also connected through a capacitor 152 to the line 114; it is also connected to one side of a capacitor 153, the other side of which is connected through a resistor 154 to the line 111. It should be noted at this point that the photocells A and B and the associated resistors constitute a bridge which compares the internal resistance of the photocell A with that of the internal resistance of the photocell B, resulting in the output signal appearing across the lines 137 and 114.

The common point between the resistor 154 and the capacitor 153 is connected to the base of a transistor 155 whose collector is connected to the line 111 and whose emitter is connected through the resistance element of a potentiometer 156, to the line 143. The movable element of the potentiometer 156 is also connected to one side of a capacitor 158, the other side of which is connected through a resistor 159 to the line 111. The common point between the resistor 159 and the capacitor 158 is connected to the base of a transistor 161. The collector of the transistor 169 is connected through a resistor 162 to the line 111. The common point between the collector of the transistor 161 and the resistor 162 is connected to one side of a capacitor 163, the other side of which is connected through a resistor 164 to the line 111. The emitter of the transistor 161 is connected to the movable element of a switch 165 having two contactors, one of which is connected through a resistor 166 of the line 114 and the other of which is connected through a resistor 167 to the line 114. The ends of the resistors 166 and 167 which are connected to the switch 165 are connected by two capacitors 168 and 169, the common point of which is connected by a line 171 through a resistor 172 to the line 114.

The common point between the resistor 164 and the capacitor 163 is connected to the base of a transistor 173. The collector of the transistor 173 is connected through a resistor 174 to the line 111 and also to one side of a capacitor 175. The other side of the capacitor 175 is connected to the emitter of the transistor 173 and also through a resistor 176 to the line 114. The common point shared by the resistor 174 and the capacitor 175 is connected to one side of a capacitor 177, the other side of which is connected through a resistor 178 to the line 111. The common point between the resistor 178 and the capacitor 177 is connected to the base of a transistor 179, the collector of which is connected to the line 111. The emitter of the transistor 179 is connected to the common point between the resistor 172 and the line 171, which, in turn, is connected by a line 181 connected to one side of a capacitor 182.

The other side of the capacitor 182 is connected by a line 183 to a center tap of the secondary winding of the transformer 133. This center tap is connected through a resistor 184 to one end of the secondary winding. The two ends of the secondary winding are connected by a resistor 185, a rectifier 186, a rectifier 187, and a resistor 188 in series. The ends of the secondary of the transformer 133 are also connected by a resistor 189, a rectifier 191, a rectifier 192, and a resistor 193 all in series. The rectifiers 186 and 187 are both arranged so that current may flow only from the resistor 185 to the resistor 188. The rectifiers 191 and 192 are both arranged to allow current to flow only from the resistor 193 toward the resistor 189. The common point between the rectifier 186 and the rectifier 187 is connected to one side of a capacitor 194, the other side of which is connected to the common point between the rectifiers 191 and 192. One side of the meter 74 is connected by a line 195 to the common point between the capacitor 194 and the rectifiers 186 and 187. The other side of the meter 74 is connected by a line 196 to the line 113. The two sides of the meter 74 are connected, respectively, to lines 75 and 76 which take part in the control function of the apparatus. The circuit 109 including the photocells C and D and the meter 71 is exactly similar to the circuit 112 which has just been described. The opposite sides of the meter 71 are connected to lines 72 and 73 in order to take part in a control function.

Both of the circuits 109 and 112 are supplied with regulated voltage on the lines 108 and 113. The line 113 as well as the lines 98 and 114 and 143 constitute a neutral or ground potential, while the high voltage side is introduced into the circuits along the lines 108 and 111. Both circuits contain a free-running multivibrator, a bridge circuit in which two photocells are involved, and an amplifier; in the case of the circuit 112 the amplifier is made up by the transistors 155, 161 and 173 and the associated resistors and capacitors. The output of this amplifier is fed back to the circuit including the meter 74 and the transformer 133. These last elements form a phase and amplitude detector, the output of which appears on the lines 75 and 76 in the case of the circuit 112 and the lines 72 and 73 in the case of the circuit 109.

Figure 8:
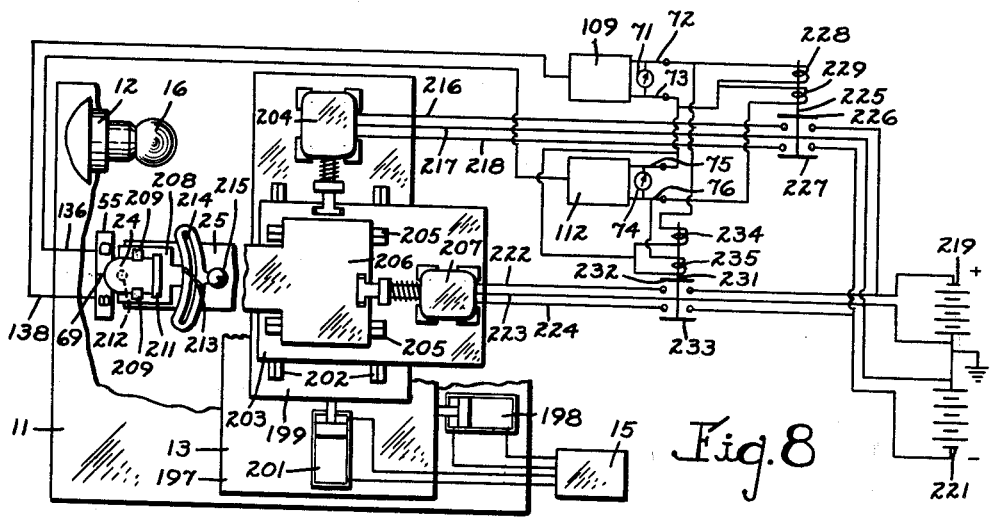
FIG. 8 is an electrical schematic view of certain apparatus constituting a part of the invention.

FIG. 8 shows the manner in which the various elements of the machine are connected together. First of all, the slit 55 is shown as divided in the center by a line constituting the dividing line 69 of the surfaces 67 and 68 of the mirror 66. The dividing of the slit in this way into two sensing areas which, for the purposes of identification, are labeled B and D, since these are the portions whose light admission and tool intrusion affect the photocells B and D. For the purposes of description, the signals originating in the scanning areas B and D are carried to the control circuits 109 and 112 by lines 138 and 136, respectively. The workpiece 16 is shown mounted on the workhead 12 which, in turn, is mounted on the base 11 of the machine. Also mounted on the base is the toolholder 13 consisting of a table 197 mounted on the base 11 for longitudinal sliding motion relative to the axis of the workpiece. A hydraulic linear actuator 198 produces this longitudinal feed motion and is connected to the tape control apparatus 15. On the upper surface of the table 197 is mounted another table 199 for movement transversely of the axis of the workpiece, and this movement takes place under the impetus of a hydraulic linear actuator 201 which is connected for control to the tape control apparatus 15. The upper surface of the table 199 is provided with parallel rails 202 extending transversely of the axis of the workpiece and having slidably mounted thereon a table 203. Also mounted on the upper surface of the table 199 is a reversible D.C. motor 204 having a shaft threadedly engaging a nut attached to the table 203. Rotation of the motor shaft in either direction produces movement transversely of the axis of the workpiece along the rails 202 of the table 203. The upper surface of the table 203 is provided with parallel rails 205 which extend longitudinally of the axis of the workpiece 16 and on which is slidably mounted a table 206. Also mounted on the upper surface of the table 203 is a reversible D.C. motor 207 having a threaded shaft engaging a threaded nut forming part of the table 206, thus permitting longitudinal motion to and fro of the table 206 along the rails 205. Extending from the table 206 is the bar 25 at the outer end of which is mounted the tool 24. The tool is suitably mounted on a platen 208 by means of clamps 209 and a stop 211. The platen 208 is pivotally mounted on the end of the bar 25 by means of a pin 212 which extends upwardly from the bar 25 into a suitable bore in the platen 208. The platen is normally locked against rotation about the pin 212 by means of a wing nut 213 threaded on a stud extending vertically from the bar 25 and lying within a slot 214 formed in the platen 208 and concentric with the pin 212. The platen is supplied with a handle 215 for rotating the platen on occasion.

The motor 204 is connected by three lines 216, 217, and 218 to sources of D.C. current such as batteries 219 and 221. The centerline 217 is connected to ground, while the line 216 is connected to a high voltage portion of the battery 219, and the line 218 is connected to a voltage of opposite polarity at the battery 221. Current arriving from the lines 216 and 217 causes rotation of the motor 204 in one direction and current arriving from the lines 217 and 218 causes rotation of the motor 204 in the other direction. In a similar way, the motor 207 is connected by lines 222, 223, and 224 to the batteries 219 and 221. Associated with the lines 216, 217, and 218 connected to the motor 204 is a relay 225 having a normally-open contactor 226 in the line 216 and a normally-open contactor 227 in the line 218. The relay is provided with the two actuating coils 228 and 229 which are connected to the circuits 109 and 112 so as to subtract the signals. The relay 225 is constructed in such a way that if the signals were exactly equal arriving at the coils 228 and 229, the contactors 226 and 227 will both remain open, but if one coil dominates the other, one contactor or the other will close causing the motor to be actuated. In a similar way a relay 231 is associated with the lines 222, 223, and 224 and is provided with a normally-open contactor 232 which lies in the line 222 and a normally-open contactor 233 which lies in the line 224. The relay is provided with actuating coils 234 and 235 which are connected to the circuits 109 and 112 so as to receive the signals additively. The relay is designed so that if the signals on the coils 234 and 235 add up to a predetermined value, neither the contactor 232 nor the contactor 233 will be closed, i.e., both contactors will remain in a neutral, open position. If, however, the sum of the voltages is less than the pre-determined value or more than the pre-determined value, one or the other of the contactors will be closed and the motor 207 will be energized.

Figure 9:
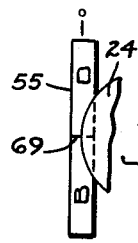
FIGS. 9 through 19 show schematically various important relationships existent at times in various parts of the invention.
Figure 10:
Figure 11:
Figure 12:
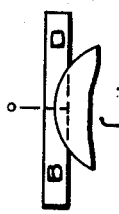
Figure 13:
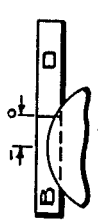
Figure 14:
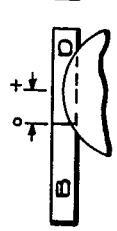

The operation of the apparatus will now be readily understood in view of the above discussion. First of all, the workpiece 16, which is to be formed with a surface 17 of revolution, is mounted on the workhead 12 and the motor 18 is energized by use of the proper switch on the manual control panel 14, thus rotating the workpiece about the axis of the surface of revolution. The bar 25 is moved by means of the actuators 198 and 201 in such a manner that the tool 24 is introduced into the bore 57 in the tool locating and checking apparatus 19. This apparatus has been very accurately mounted relative to the base 11 of the machine. However, before the tape control apparatus 15 can take over the movement of the tool in order to form the desired surface of revolution, the tool must be located at a zero position laterally and longitudinally of the workpiece. Once the tool has been located in such a position that its cutting edge 28 is accurately located both longitudinally and laterally of the axis of the surface of revolution. Then, the operator brings the tape control apparatus 15 into operation and it operates automatically on the feed actuators 198 and 201 to move the tool laterally and longitudinally according to the pattern which has been recorded on the tape. So far as longitudinal adjustment is concerned, FIG. 9 shows the ideal position of the tool 24 relative to the slit 55 and the dividing line 69. The amount of light which arrives at the photocell D will be the proportional to the area of the sensing area D in FIG. 9 minus the amount of intrusion of the tool into that area. Similarly, the amount of light which reaches the photocell B is the amount of light in the rectangle B minus the amount of light cut off by the intrusion of the tool into the area B. The voltage originating in the sensing area D appears on the line 136, is suitably amplified in the circuit 109, and appears on the meter 71 as well as across the lines 72 and 73. At the same time, a signal indicative of the exposed portion of the sensing area B appears on the line 138, is amplified in the circuit 112, and appears on the meter 74 as well as across the lines 75 and 76. These two signals are presented to the relay 231 additively. This relay is set up so that if the sum exceeds a predetermined value (which, in the preferred embodiment, is zero), the relay will close the contactor 232 causing current to flow through the lines 222 and 223 and rotate the motor 207 so that the table 206 and the bar 25 is moved to the left along with the tool 24. This is a situation which exists in FIG. 10. If, however, the tool is to the left of the desired advance point, as shown in FIG. 11, the signals will be small, their sum as it appears on the relay 231 will be less than the predetermined value, and the relay will operate to close the contactor 233, causing current to flow through the lines 223 and 224 and rotate the motor 207 in such a way as to advance the tool 24, so that it eventually reaches the position shown in FIG. 9. The control system shown for doing this is simplified for the purposes of illustration; of course, it will be understood that it is within the skill of the worker in the art to provide for circuitry to prevent hunting about the zero position and so on. So far as the lateral positioning of the tool 24 is concerned, the ideal lateral position relative to the sensing areas B and D is shown in FIG. 12 in which condition the signals on the photocells B and D will be equal and the difference between them will be a pre-determined amount; in the preferred embodiment this would be zero. If the tool 24 is too far laterally forward of the machine, it will intrude into the area B more than into the area D, as shown in FIG. 13. This means that the signal presented on the coil 228 of the relay 225 will be much greater than the signal presented on the coil 229 and the relay will be actuated in such a manner that the contactor 226 will close, causing current to flow through the lines 216 and 217 to rotate the motor 204 in such a way that the bar will be moved laterally rearwardly to the position shown in FIG. 12. If, on the other hand, as is shown in FIG. 14, the tool 24 is too far rearwardly of the machine, the signal originating in the sensing area B will be much greater than that from the sensing area D, so that the relay 225 will be actuated so that the contactor 227 will be closed, current will flow through the line 217 and 218 to rotate the motor 204 in such a way that the tool will be moved forwardly to the position of FIG. 12.

Referring to FIG. 5, it can be seen that during the operation of the invention, the light originating in the incandescent bulb 36 forms a conical light ray 38. This light ray not only falls into the bores 43 and 44 and onto the reference photocells A and C, but the amount of such light falling on these photocells may be adjusted by proper setting of the set screws 49 and 51. The ray also passes downwardly through the bore 42 and the lens unit 45. The light ray comes to a focus between the unit 45 and the lens 53; the lens 53 acts to collineate the light just before it passes through the slit 55 in the plate 54. This light passes down the bore 56 and through the lateral bore 57 where the tool is located and from there passes through the slit 61 in the plate 59. Eventually, it strikes the surfaces 67 and 68 of the mirror and is directed laterally in both directions along the passage 62 until the photocells B and D are reached.

Referring to FIG. 7, the circuits 109 and 112 are presented with substantially regulated voltage at 6.5 volts. This permits the free running multivibrator, of which the transistors 119, 121 are an integral part, to operate at a substantial stable frequency. This 3.5 kilocycle signal is introduced through the transformer 133 to the phase and amplitude detector of which the meter 74 is a part, and at the same time is introduced through the transformer 135 into the bridge circuit of which the photocells A and B are a part. When the tool intrudes into the sensing area B more than into the sensing area A, the resistance of the photocell B is reduced below that of the reference photocell A. The bridge is unbalanced by a certain amount and this unbalanced signal is amplified through the circuitry associated with the transistors 155, 161, 173, and 179. This amplified out-of-balance signal arrives on the line 181 and is compared with the reference signal which arrives directly from the multivibrator to the transformer 133. The meter 74 indicates not only how much the intrusion of the tool into the sensing area B differs from a pre-determined amount, but also whether it is greater or less than the desired amount. Suppose, for instance, one considers the amount of intrusion of the tool 24 as it is shown in FIG. 12 as the ideal or predetermined position. The elements associated with the photocells A and B can be adjusted so that when the tool is in this position, the meter 74 will read zero and the voltage across the lines 75 and 76 is also zero. This can be accomplished not only by adjusting the setscrew 51 but by adjustment of the variable potentiometer 134 or the potentiometer 141 or by properly selecting the resistor 184. It should be noted at this point that the switch 145 is set up in such a way as to provide for different sizes of tools which may be used. Once the proper adjustment has been made so that, when the tool is in the proper position within the sensing area B and D, the meters 74 and 71 read zero, then a position of the tool in which it intrudes a greater distance or a lesser distance into the sensing areas will cause the meter to read plus or minus and the voltages on the lines 72 and 73 and 75 and 76 will be positive or negative values.

Figure 15:
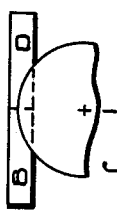
Figure 16:
Figure 17:
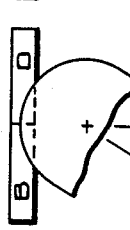
Figure 18:
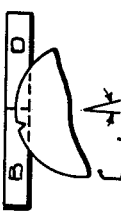
Figure 19:

Once the tool 24 has been accurately located relative to the slit 55, it is also, therefore, accurately located relative to the base 11 and the workpiece 16. Then, the tape control apparatus 15 may be operated to move the tool through a predetermined pattern by means of the main feed actuators 198 and 201 of the machine. Because the edge 28 of the tool is perfectly circular, it is not necessary that the bar 25 be arranged in the same angular aspect at all times relative to the axis of the workpiece. It is desirable, however, that any rotation, as the cutting operation proceeds, take place about the radius of curvature 29, thus presenting different parts of the edge 28 to the workpiece, but not causing any inaccuracy due to parts of the cutting edge being further from the axis of pivoting than another part, as would be true if the cutting edge were other than circular. In order to determine the accuracy of the circular cutting edge and its perfection, it is possible to use the present apparatus before the cutting operation is begun. The tool is introduced into the sensing areas B and D as shown in FIG. 15. Then, the wing nut 213 is loosened to permit swinging of the platen 208 relative to the bar 25. The platen and the tool are swung to one side, as shown in FIG. 16, and, then, to the other side, as shown in FIG. 17 through a substantial angle. If, as is shown in FIGS. 18 and 19, the edge is imperfect (in that a notch exists, or the circular cutting edge is not exactly concentric with the center of curvature 29, as presented in the apparatus by the center of the pin 212), the amount of intrusion of the tool into the sensing areas B and D will differ during the rotation. For instance, in FIG. 18, the notch would cause the amount of intrusion in the sensing area B to be less than in the sensing area D, so that, whereas the meter 74 might read zero, the meter 71 would read positive by a substantial amount. Then, when the tool is rotated through an angle, the notch moves into the sensing area D and the readings on the meters reverse themselves. Any movement of the meter needles during rotation of the workpiece would indicate an imperfection of some kind in that it would indicate that the amount of intrusion into a sensing area varies as the tool is rotated about what would be the center of curvature of a perfect edge. With a perfect edge the meter reading should stay substantially fixed. It is of interest to note that if the cutting edge is perfect, returning the platen 208 and the tool 24 to an exact angular location relative to the bar 28 is not necessary. In any case, the wing nut 213 would be tightened to lock the platen and the bar together after this check has been made.

It is obvious that minor changes may be made in the form and construction of the invention without departing from the material spirit thereof. It is not, however, desired, to confine the invention to the exact form herein shown and described, but it is desired to include all such as properly come within the scope claimed.

The invention having been thus described, what is claimed as new and desired to secure by Letters Patent, is:

1. A machine tool, comprising a base, a tool holder mounted on the base for movement along either of two angularly-disposed lines, a tool mounted on the said holder and having a substantially perfect semi-circular cutting edge, a device including two adjacent inspection areas into which the tool is introduced and including means indicating the relative amounts of intrusion of the tool into the two areas, and apparatus responsive to the indicating means and the sum and difference of the indicated values to move the tool holder along one of the said lines until the indicated values differ by a predetermined value and when the sum of the indicated values differs from a predetermined value to move the tool holder along the other of the said lines until the sum is equal to the last-named predetermined value.

2. A machine tool, comprising a base, a tool holder mounted on the base for movement along either of two lines at a right angle to one another, a tool mounted on the said holder and having a substantially perfect circular cutting edge symmetrical about a centerline, a device including a slit with a long dimension extending at a right angle to the centerline of the tool and divided into two adjacent inspection areas into which the tool is introduced, the device including means indicating the relative amounts of intrusion of the tool into the two areas, and apparatus responsive to the indicating means and the sum and difference of the indicated values to move the tool holder along one of the said lines until the indicated values differ by a predetermined value and when the sum of the indicated values differs from a second predetermined value to move the tool holder along the other of the said lines until the sum is equal to the second predetermined value.

3. A machine tool, comprising a base, a tool holder mounted on the base for movement along either of two lines at a right angle to one another, a tool mounted on the said holder and having a substantially perfect circular cutting edge, a device including a light source directed at a substantial right angle to the plane of the cutting edge and through two adjacent inspection apertures over which the tool is introduced, the device including photosensitive elements indicating the relative amounts of intrusion of the tool into the two areas, and apparatus responsive to the indicating means and the sum and difference of the indicated values to move the tool holder along one of the said lines until the indicated values differ by a predetermined value and when the sum of the indicated values differs from a second predetermined value, to move the tool holder along the other of the said lines until the sum is equal to the second predetermined value.

4. A machine tool, comprising a base, a tool holder mounted on the base for movement along either of two lines at a right angle to one another, a tool having a substantially perfect circular cutting edge symmetrical about one of the said lines and mounted on the said holder, a device including a light source directed at a substantial right angle to the plane of the cutting edge and through a slot with a long dimension extending at a right angle to the said one of the lines and divided into two adjacent inspection areas over which the tool is introduced, the device including photo-sensitive elements indicating the relative amounts of intrusion of the tool into the two areas, and apparatus responsive to the indicating means and the sum and difference of the indicated values to move the tool holder along one of the said lines until the indicated values differ by a first predetermined value and when the sum of the indicated values differs from a second predetermined value to move the tool holder along the other of the said lines until the sum is equal to the second predetermined value.

References Cited by the Examiner

UNITED STATES PATENTS

| | | | |
|---|---|---|---|
| 938,013 | 10/09 | Mitchell | 82—12 |
| 2,460,491 | 2/49 | Cooke | 51—165 |
| 2,485,355 | 10/49 | Brennan. | |
| 2,590,717 | 3/52 | Lowe. | |
| 2,651,889 | 9/53 | Hannum. | |
| 2,692,527 | 10/54 | Wetzel | 88—14 |
| 3,012,469 | 12/61 | Clayborne. | |

WILLIAM W. DYER, JR., *Primary Examiner.*